US006557842B2

(12) United States Patent
Conard-White et al.

(10) Patent No.: US 6,557,842 B2
(45) Date of Patent: May 6, 2003

(54) PAPER CLIP AUTOMATIC ATTACHING DEVICE AND A DOCUMENT SET PRODUCING MACHINE HAVING SAME

(75) Inventors: Sally A. Conard-White, Rochester, NY (US); LynneMarie Tatar, Rochester, NY (US); Connie J. Tiberio, Webster, NY (US)

(73) Assignee: Xerox Corporation, Stamford, CT (US)

( * ) Notice: Subject to any disclaimer, the term of this patent is extended or adjusted under 35 U.S.C. 154(b) by 120 days.

(21) Appl. No.: 09/834,007

(22) Filed: Apr. 12, 2001

(65) Prior Publication Data

US 2002/0150415 A1 Oct. 17, 2002

(51) Int. Cl.[7] .................................................. B23Q 7/10

(52) U.S. Cl. ................................ 270/58.09; 270/58.08; 221/276; 221/232; 399/410; 29/243.56; 29/814

(58) Field of Search ........................... 270/58.07, 58.08, 270/58.09; 221/232, 273, 275, 276; 29/814, 818, 243.56; 399/410

(56) References Cited

U.S. PATENT DOCUMENTS 2,641,051 A * 6/1953 Vick .......................... 221/232
3,324,538 A * 6/1967 Christensen ................ 221/232
3,660,870 A * 5/1972 Murphy ....................... 24/67 R
4,261,098 A * 4/1981 Lincoln .................... 29/243.56
4,946,154 A * 8/1990 Nakamura ............... 270/58.08
5,592,280 A * 1/1997 Ishizuka et al. ............ 227/155
5,603,492 A * 2/1997 Mandel et al. ........... 270/58.09
6,206,236 B1 * 3/2001 Hakala ....................... 221/232

* cited by examiner

*Primary Examiner*—Patrick H. Hackey
(74) *Attorney, Agent, or Firm*—Tallam I. Nguti

(57) ABSTRACT

A paper clip automatic attaching device includes (a) a support assembly including a set compiler tray defining (i) a sheet supporting set plane, (ii) a first open space below, and a second open above the set plane; and (b) a paper clip travel path assembly defining a paper clip travel path adjoining the set plane. The travel path assembly includes (i) a first support member having a first guide surface for guiding a first leg of the paper clip into a first position below the set plane, and (ii) a second support member having a second guide surface for deflecting a second leg of the paper into a second position above the set plane. The automatic paper clip attaching device also includes a clip holding assembly for holding a stack of the paper clips for feeding into the paper clip travel path; and a powered device for automatically pushing a lead paper clip, legs first, into an attached relationship with a set of sheets on the set plane.

12 Claims, 6 Drawing Sheets

PAPER CLIP AUTOMATIC ATTACHING DEVICE AND A DOCUMENT SET PRODUCING MACHINE HAVING SAME

RELATED APPLICATION

This application is related to U.S. application Ser. No. 09/833,778 entitled "AUTOMATIC CLIP ATTACHING MECHANISM AND A DOCUMENT SET PRODUCING MACHINE HAVING SAME" filed on the same date herewith and having at least one common inventor.

BACKGROUND OF THE INVENTION

The present invention relates to an apparatus for automatically binding sheets of paper together, and more specifically to a paper clip automatic attaching device and a document or copy set producing machine having same.

Copying or reproduction machines include but are not limited to electrostatographic process machines. Generally, however, the process of electrostatographic copying or reproduction machines, such as light lens or scanner type machines, includes uniformly charging an image frame of a moving photoconductive member, or photoreceptor, to a substantially uniform potential, and imagewise discharging it or imagewise exposing it to light reflected from an original image being copied or reproduced. The result is an electrostatically formed latent image on the image frame of the photoconductive member. For multiple original images, several such frames are similarly imaged. The latent image so formed on each frame is developed by bringing a charged developer material into contact therewith. Two-component and single-component developer materials are commonly used. A typical two-component developer material comprises magnetic carrier particles, also known as "carrier beads," having fusable charged toner particles adhering triboelectrically thereto. A single component developer material typically comprises charged toner particles only.

In either case, the fusable charged toner particles when brought into contact with each latent image, are attracted to such image, thus forming a toner image on the photoconductive member. The toner image is subsequently transferred at a transfer station to an image receiver or copy sheet. The copy sheet is then passed through a fuser apparatus where the toner image is heated and permanently fused to the copy sheet forming a hard copy of the original image. Hard copy sheets formed as such can then be accumulated into a set that needs binding.

Document production machines such as copiers and printers conventionally come with the capability of binding the set of hard copies by stapling using a staple driving device as is well known. The other means for binding such sets together is by inserting paper clips. Currently, the most common option available for paper clipping sets of sheets is to do so manually. There is however a vary wide variety of paper clips, none of which seems to have an advantage over the others in terms of usage.

The undesirable result is a mess of paper clips sitting on top of the machine (not always in the provided area). Manually clipping a set of documents can also be a frustrating experience, especially due to the fact that clips and sheets can become tangled, or that there is lack of paper clips at the machine. Paper clips also tend to fall easily into the copiers and printers, thus causing machine problems and increasing the need for on-site technical representative repairs. Productivity is also affected because of the need to wait in line for the copier while someone manually tries to properly insert paper clips to a set of documents before returning to their desk. The same problems occurs with printers.

Automatic paper clip inserters or fitting machines have been suggested for a wide variety of certain types of paper clips as disclosed for example, in U.S. Pat. No. 4,946,154. But apparently these have not found acceptance and wide use as there is still a large population of copiers and printers out there relying mainly on stapling or manual clip insertion.

There is therefore a need for a simplified and widely acceptable automatic clip inserter for sets of hard copies of documents produced by copiers and printers.

SUMMARY OF THE INVENTION

In accordance with the present invention, there has been provided a paper clip automatic attaching device for automatically attaching, to a set of sheets, a paper clip having a crown portion and a pair of deflectable side by side legs. The automatic paper clip attaching device includes (a) a support assembly including a set compiler tray defining (i) a set plane for supporting a set of sheets, (ii) an open space below the set plane, and (iii) an open space above the set plane; and (b) a paper clip travel path assembly defining a paper clip travel path adjoining the set plane for guiding a paper clip towards the set plane to be automatically attached to an edge of the set of sheets. The paper clip travel path assembly includes (i) a first support member having a first guide surface for guiding a first leg of the pair of deflectable side by side legs into a first position within the space below the set plane, and (ii) a second support member spaced from the first support member and having a second guide surface for deflecting a second leg of the pair of deflectable side by side legs into a second position within the open space above the set plane. The automatic paper clip attaching device also includes clip holding assembly for holding a stack of the paper clip in position for feeding a lead paper clip in the stack into the paper clip travel path; and a powered device for contacting the common crown portion of the lead paper clip in the stack, and automatically pushing such lead paper clip, legs first, into an attached relationship with the set of sheets on the set plane.

BRIEF DESCRIPTION OF THE DRAWINGS

In the detailed description of the invention presented below, reference is made to the drawings, in which.

DETAILED DESCRIPTION OF THE PREFERRED EMBODIMENT

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
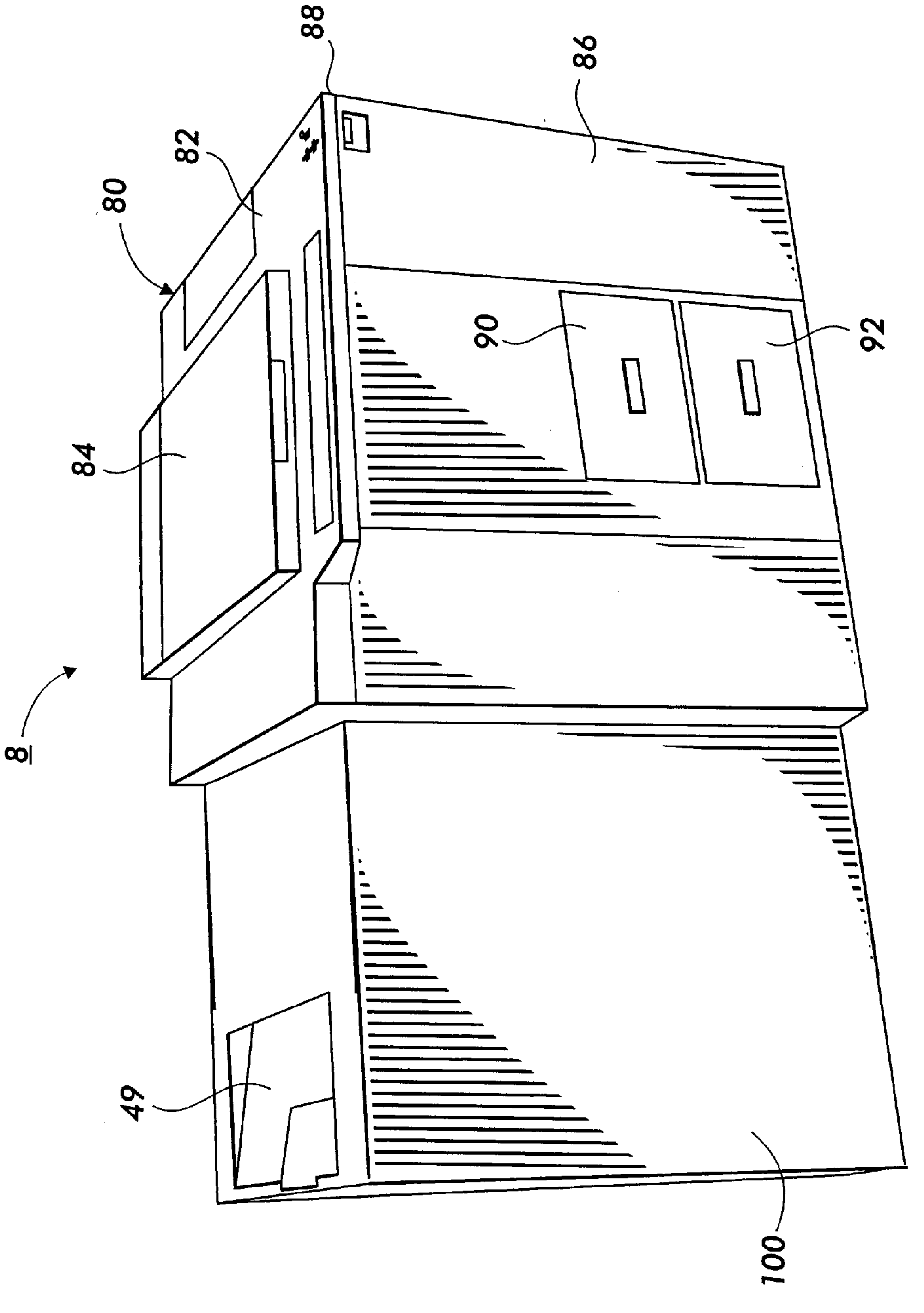
FIG. 1 is an external view of a document set producing machine including a finisher having the paper clip automatic attaching device of the present invention.

Referring first to FIG. 1, the copying machine 8 is illustrated externally and includes a frame shown generally as 80 including a top horizontal frame panel 82. The top horizontal panel 82 includes a platen cover 84, and could instead include an automatic document handler (not shown), as well as an output tray 49. Copies of original documents reproduced by the process of the machine 8 can be collected as described above in a bin sorter apparatus (not shown) having individual bins (not shown). The frame 82 also includes a front vertical panel 86 that has openings for copy sheet supply trays 90, 92, for example, and that forms a corner SB with the top horizontal panel 82.

Figure 2:
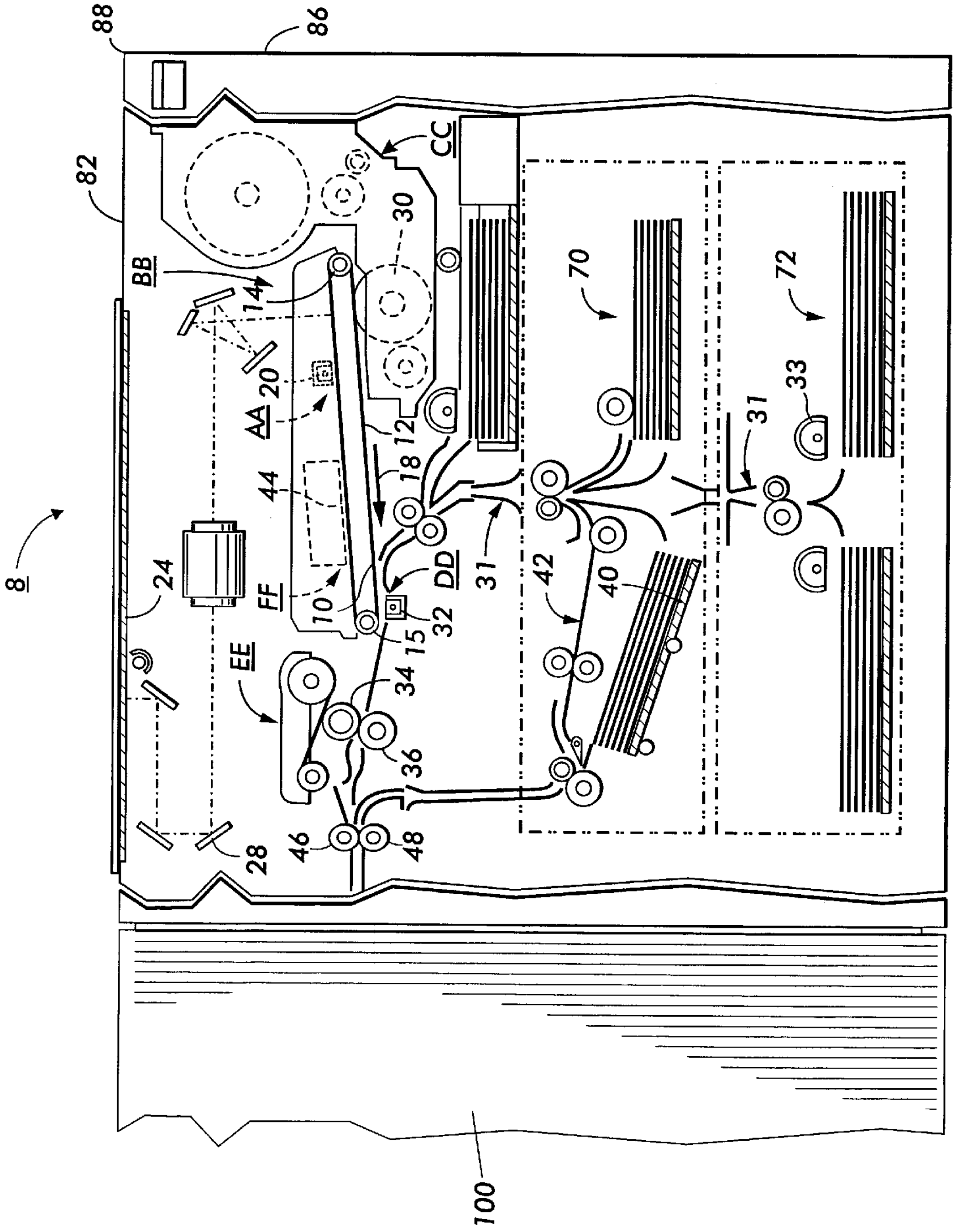
FIG. 2 is a vertical schematic view of the internal process components and stations of the document set producing machine of FIG. 1.

Referring next to FIG. 2, the machine 8 has conventional imaging processing stations associated therewith, including a charging station AA, an imaging/exposing station BR, a development station CC, a transfer station DR a fusing station EE, and a cleaning station FE. Importantly, the machine B includes a paper clip automatic attaching device of the present invention (to be described in detail below).

As shown, the machine 8 has a photoconductive belt 10 with a photoconductive layer 12 which is supported by a drive roller 14 and a tension roller 15. The drive roller 14 functions to drive the belt in the direction indicated by arrow 18. The drive roller 14 is itself driven by a motor (not shown) by suitable means, such as a belt drive.

The operation of the machine 8 can be briefly described as follows. Initially, the photoconductive belt 10 is charged at the charging station AA by a corona generating device 20. The charged portion of the belt is then transported by action of the drive roller 14 to the imaging/exposing station BB where a latent image is formed on the belt 10 corresponding to the image on a document positioned on a platen 24 via the light lens imaging system 28 of the imaging/exposing station BB. It will also be understood that the light lens imaging system can easily be changed to an input/output scanning terminal or an output scanning terminal driven by a data input signal to likewise image the belt 10. As is also well known, the document on the platen 24 can be placed there manually, or it could be fed there automatically by an automatic document handler device (not shown).

The portion of the belt 10 bearing the latent image is then transported to the development station CC where the latent image is developed by electrically charged toner material from a magnetic developer roller 30 of the developer station CC. The developed image on the belt is then transported to the transfer station DD where the toner image is transferred to a copy sheet fed from a sheet cassette tray, for example, sheet cassette tray assemblies 70, 72. As shown, the sheets are fed, for example, by a copy sheet handling system 31 that each includes a feed roller 33.

At the transfer station DD, a corona generating device 32 is provided for charging the copy sheet so as to attract the charged toner image from the photoconductive belt 10 to the copy sheet. The copy sheet with the transferred image thereon is then directed to the fuser station EE. The fuser apparatus at station EE includes a heated fuser roll 34 and backup pressure roll 36. The heated fuser roll 34 and pressure roll 36 rotatably cooperate to fuse and fix the toner image onto the copy sheet. The copy sheet then, as is well known, may be selectively transported to the finishing area, or to a duplex tray 40 along a selectable duplex path 42 for duplexing.

The portion of the belt 10 from which the developed image was transferred is then advanced to the cleaning station FF where residual toner and charge on the belt are removed by a cleaning device such as a blade 44, and a discharge lamp (not shown) in order to prepare the portion for a subsequent imaging cycle.

When not doing duplex imaging, or at the end of such duplex imaging, the copy sheets upon finally leaving the fusing rolls 34, 36, are passed to rolls 46 and 48 for input to the finisher 100. From the input rolls 46, 48, the copy sheets are fed, for example, individually to the output tray 49, or as a set of such sheets to a compiler tray 144 (FIG. 4) of the finisher 100 for binding by a staple driving unit 138 or by the paper clip automatic attaching device 140 in accordance with the present invention.

Figure 3:
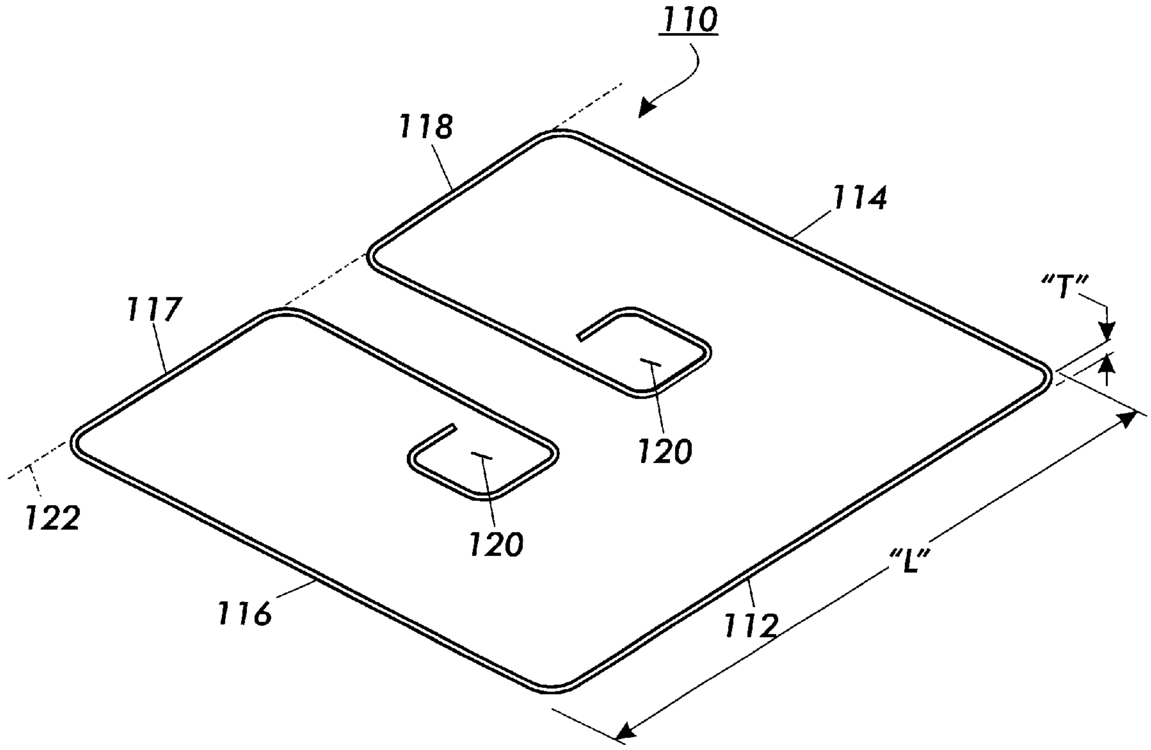
FIG. 3 is an illustration of a paper clip, for example a regal clip, for use in the paper clip automatic attaching device of the present invention.
Figure 6:
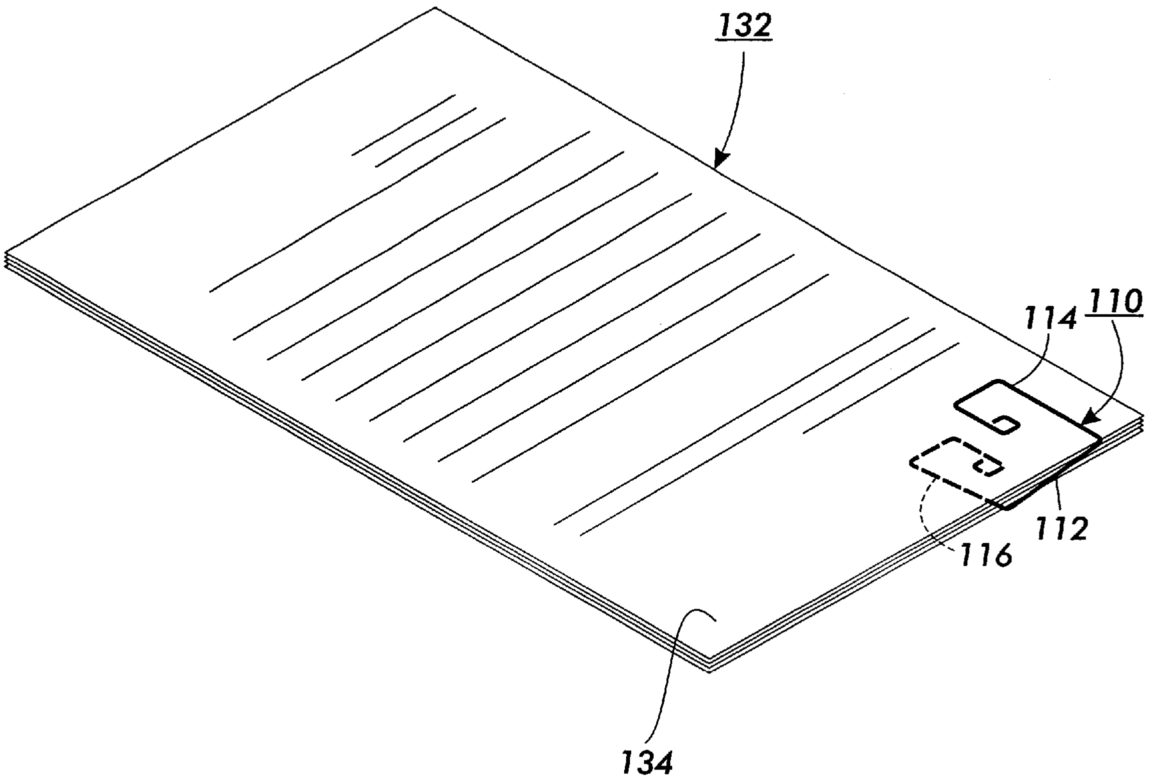
FIG. 6 is an illustration of a set of sheets bound with a regal clip using the paper clip automatic attaching device of the present invention.

Referring now to FIGS. 3 and 6, a paper clip 110, such as a regal type clip, that is suitable for attaching using the paper clip automatic attaching device 140 of the present invention, and a set of sheets so attached, are illustrated. As shown, the paper clip 110 includes a crown portion 112, and a pair of deflectable side by side legs 114, 116 connected by the crown portion 112. The crown portion 112 and each of the legs 114, 116 each have a thickness "T", and the crown portion 112 has a length "L". The distal ends 117, 118 of the legs 114, 116 may each have a guide opening 120 that can be used for holding a stack of such clips reliably and in proper orientation.

The distal ends 117, 118 of the deflectable legs 114, 116, when in the unattached position, normally are aligned and lie on a common plane 122 (FIG. 3). To attach the clip 110 to a set 132 of sheets (FIG. 6), at least one of the distal ends 117, 118 is moved out of the common plane 122 and relative to the other leg, thus allowing space between the distal ends for inserting an edge portion 134 of a set of sheets to be bound. When a set 132 of sheets is bound thus, the legs 114, 116 end up on opposite side of the edge portion 134 of the set of sheets.

Referring now to FIGS. 3–6, a paper clip automatic attaching device 140 in accordance with the present invention, includes a paper clip stack clip holding assembly 160 and a paper clip pushing or driving mechanism 170. When a set 132 of sheets are to be bound together by the clip, an edge portion 134 of the set 132 of sheets is positioned toward the paper clip automatic attaching device 140 so as to easily fit between the mutually opened deflectable side by side legs 114, 116 of a paper clip 110. The present invention provides an option to for automatically binding a set of document sheets at a copier/printer using a paper clip in a manner similar to stapling processes currently available on many copiers/printers. The paper clip is a standard metal paper clip that is not very difficult to dispense, and the apparatus of the present invention (the paper clip automatic attaching device 140) makes them easy to store and dispense in a manner that would prevent tangling. Therefore, many opportunities for the paper clip dispenser to jam would cause additional service calls for the machines.

A staple driving unit 138 is also be provided in the copy reproduction machine 8, for selective use along side the paper clip automatic attaching device 140 of the present invention. A drive unit 130 selectively moves the staple driving unit 138 (shown out of the way) into staple driving position for a set of sheets 132, or out of the way of such set of sheets as shown. A set pushing tamping unit 135 is provided, as well as a set hold down unit 137, and a set pushing unit 171 for registering the sides of the set of sheets prior to staple driving or clip attachment. Since either the staple driving unit 138 or the paper clip automatic attaching device 140 can be selectively set at the compiler tray 144 of the finisher 100, the set 132 of sheets can be bound together by either a staple or the clip, depending on the purpose or the intended use of the bound copies or sheets.

The paper clip automatic attaching device 140 is suitable for automatically attaching, to a set 132 of sheets, a regal type paper clip 110 having a crown portion 112 and the pair of deflectable side by side legs 114, 116 (FIGS. 3 and 6). As illustrated, the automatic paper clip attaching device 140 includes a support assembly 142 including the set compiler tray 144 on which copy sheets are accumulated or compiled into a set 132 for binding.

Figure 4:
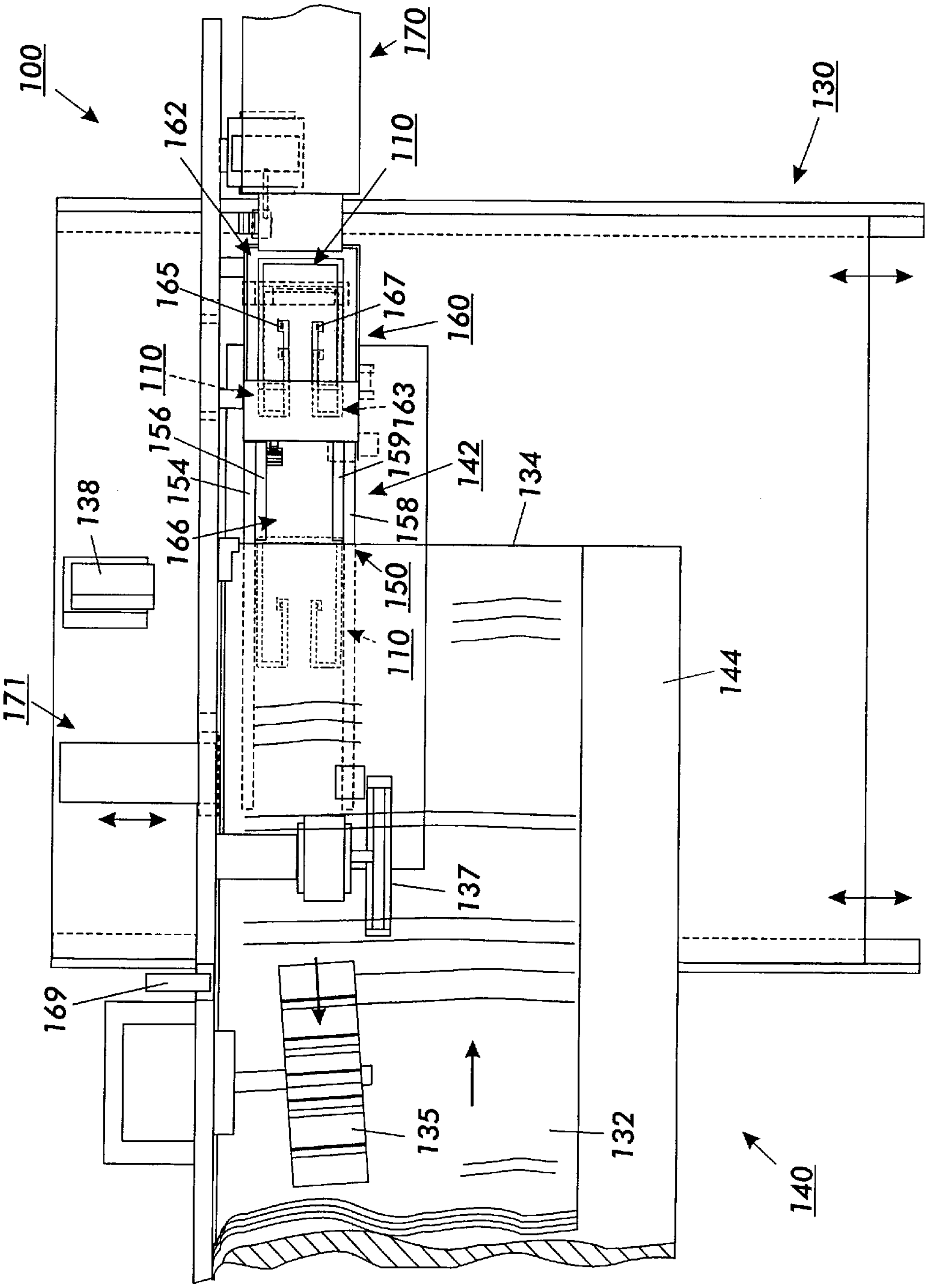
FIG. 4 shows a top view of the finisher of FIG. 1 including the paper clip automatic attaching device of the present invention.
Figure 5:
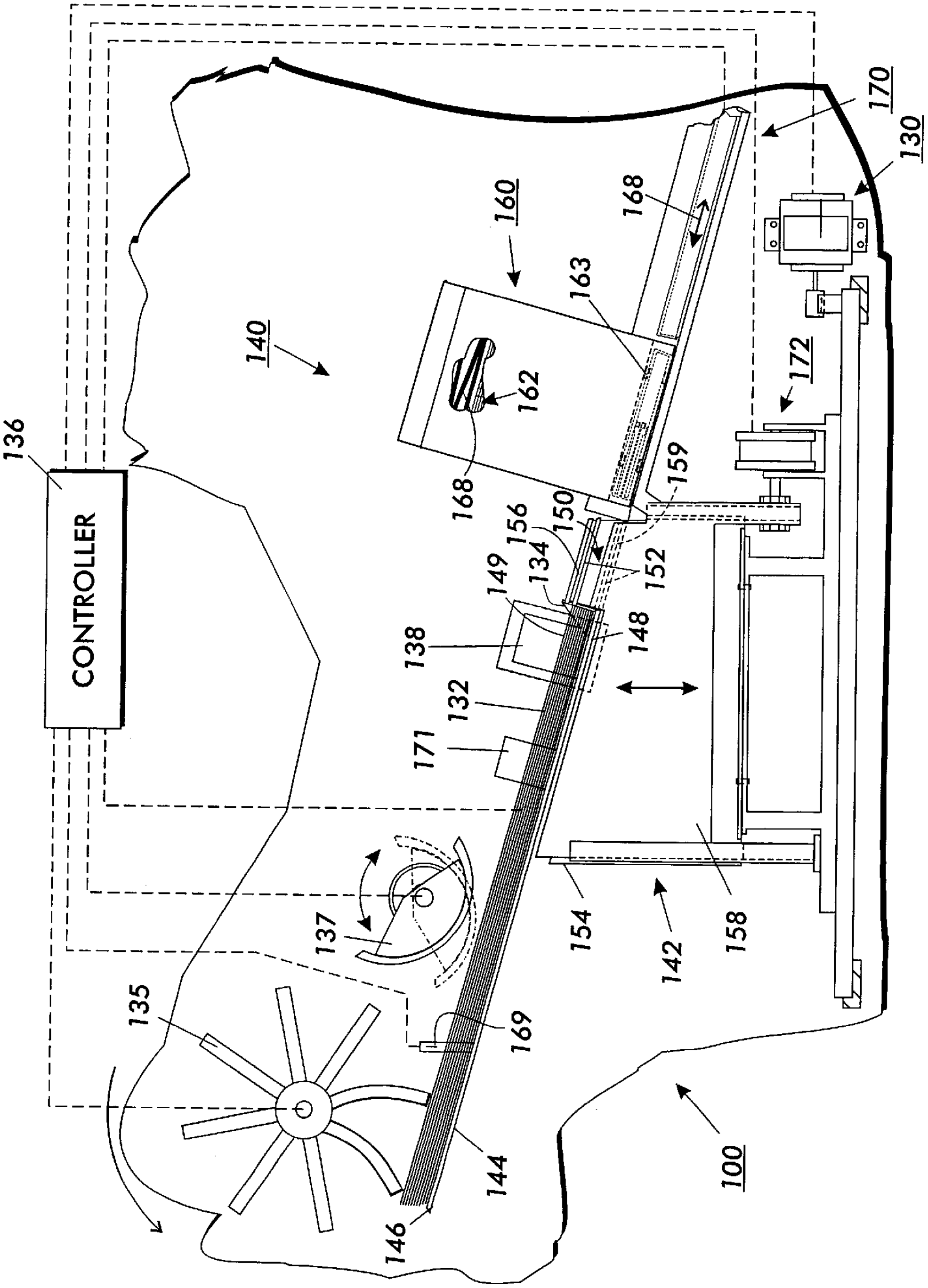
FIG. 5 shows a side view of the finisher of FIG. 1 including the paper clip automatic attaching device of the present invention.

Referring to FIGS. 4–5, the set compiler tray 144 defines a set plane 146 for supporting the set 132 of sheets, as well as, a first open space 148 below the set plane, and a second open space 149 above the set plane 146. Each open space 148, 149 is suitable for allowing passage of the distal end 117, 118 of the legs 114, 116 of a clip 110 being attached to a set 132 of sheets on the set plane 146.

The paper clip automatic attaching device 140 also includes a paper clip travel path assembly 150 defining a paper clip travel path 152 adjoining the set plane 146 for guiding a paper clip 110 towards the set plane, so that it can be automatically attached to the edge portion 134 of the set of sheets. The paper clip travel path assembly 150 includes a first support member 154 having a first guide surface 156 for guiding a first leg of the pair of deflectable side by side legs 114, 116 into a first position within the first open space 148 below the set plane 146.

The paper clip travel path assembly 150 also includes a second support member 158 that is spaced from the first support member 154, and that has a second guide surface 159 for deflecting a second leg of the pair of deflectable side by side legs 114, 116 into a second position within the second open space 149 above the set plane 146. The second guide surface 159 of the second support member 158 is spaced from the first guide surface 156 of the first support member 154, a distance slightly greater than the length "L" of the crown portion 112 of the paper clip 110. Importantly, a plane of the second guide surface 159 is inclined upwardly, relative to a plane of the first guide surface 156, for deflecting the second leg of the pair of deflectable side by side legs 114, 116 upwardly into the second position within the second open space 149 as above. Preferably, at least one of the first guide surface 156 and the second guide surface 159, comprises a slot (as shown) for retaining one or both of the pair of deflectable side by side legs 114, 116 during paper clip travel through the paper clip travel path 152.

As further illustrated, the automatic paper clip attaching device 140 also includes clip holding assembly 160 for holding a stack 162 of the paper clip 110 in position for feeding a lead paper clip 163 in the stack into the paper clip travel path 152. The clip holding assembly 160 includes a holding and travel channel 166 for holding the stack 162 of paper clips, and a spring loaded feeding mechanism 168 located within the holding and travel channel 166 for applying a force to move the lead paper clip 163 of the stack into the paper clip travel path 152.

The spring loaded feeding mechanism 168 may include a pair of guide rods 165, 167 for insertion one through each guide opening or hole 120 at the distal end of each leg 114, 116 (FIG. 3) of the paper clips in the stack 162 so as to insure proper orientation of paper clips with the holding and feeding channel 166. For ease of travel, the paper clip travel path 152 has a top to bottom dimension slightly greater than the thickness "T" of the crown portion 112, as well as of the legs 114, 116, of the paper clip 110. This is also true where the holding and travel channel connects into the paper clip travel path. The holding and travel channel 166 is preferably arranged at 90 degrees to, and connects into, the paper clip travel path 152.

The automatic paper clip attaching device 140 next includes a powered driving or pushing device or mechanism 170, for contacting the common crown portion 112 of the lead paper clip 163 in the stack 162, and automatically pushing such lead paper clip 163, legs first, into an attached relationship (FIG. 6) with the set 132 of sheets on the set plane 146.

In accordance with another aspect of the present invention, the first support member and the second support member preferably each comprise a plate, and the second support member is an upwardly and downwardly adjustable plate. A set height sensor 169 is provided for sensing a height of the set 132 of sheets on the set plane 146. A controller 136 (which may also be the controller for the document set producing machine 8) is connected to the set height sensor 169 for controlling a drive assembly 172 to adjust a height of the second guide surface 159, relative to the first guide surface 156, thereby deflecting the second leg of the pair of deflectable side by side legs 114, 116 responsively and proportionally to a sensed/height of the set 132 of sheets on the set plane.

As can be seen, there has been provided a paper clip automatic attaching device for automatically attaching, to a set of sheets, a paper clip having a crown portion and a pair of deflectable side by side legs. The automatic paper clip attaching device includes (a) a support assembly including a set compiler tray defining (i) a set plane for supporting a set of sheets, (ii) an open space below the set plane, and (iii) an open space above the set plane; and (b) a paper clip travel path assembly defining a paper clip travel path adjoining the set plane for guiding a paper clip towards the set plane to be automatically attached to an edge of the set of sheets. The paper clip travel path assembly includes (i) a first support member having a first guide surface for guiding a first leg of the pair of deflectable side by side legs into a first position within the space below the set plane, and (ii) a second support member spaced from the first support member and having a second guide surface for deflecting a second leg of the pair of deflectable side by side legs into a second position within the open space above the set plane. The automatic paper clip attaching device also includes clip holding assembly for holding a stack of the paper clip in position for feeding a lead paper clip in the stack into the paper clip travel path; and a powered device for contacting the common crown portion of the lead paper clip in the stack, and automatically pushing such lead paper clip, legs first, into an attached relationship with the set of sheets on the set plane.

While this invention has been described in conjunction with a particular embodiment thereof, it shall be evident that many alternatives, modifications and variations will be apparent to those skilled in the art. Accordingly, the present invention is intended to embrace all such alternatives, modifications and variations as fall within the spirit and broad scope of the appended claims.

What is claimed is:

1. A paper clip automatic attaching device for automatically attaching, to a set of sheets, a paper clip having a crown portion and a pair of deflectable side by side legs, the automatic paper clip attaching device comprising;

(a) support assembly including a set compiler tray defining (i) a set plane for supporting a set of sheets, (ii) a first open space below said set plane, and (iii) a second open space above said set plane;

(b) a paper clip travel path assembly defining a paper clip travel path adjoining said set plane for guiding a paper clip towards said set plane to be automatically attached to an edge of the set of sheets, said paper clip travel path assembly including (i) a first support member having a first guide surface for guiding a first leg of the pair of deflectable side by side legs into a first position within said space below said set plane, and (ii) a second support member space from said first support member and having a second guide surface for deflecting a second leg of the pair of deflectable side by side legs into a second position within said open space above said set plane;

(c) holding means for holding a stack of the paper clip in position for feeding a lead paper clip in the stack into said paper clip travel path;

(d) powered means for contacting the common crown portions of the of the lead paper clip in the stack, and automatically pushing such lead paper clip, legs first, into an attached relationship with the set of sheets on said set plane;

(e) a set height sensor for sensing a height of the set of sheets on said set plane; and (f) a controller connected to said set height sensor for adjusting a height of said second guide surface relative to said first guide surface, thereby deflecting the second leg of the pair of deflectable side by side legs responsively and proportionally to a sensed height of the set of sheets on said set plane.

2. The paper clip automatic attaching device of claim 1, wherein said second guide surface of said second support member is spaced from said first guide surface of said first support member, a distance slightly greater than a length of the crown portion of the paper clip.

3. The paper clip automatic attaching device of claim 1, wherein a plane of said second guide surface is inclined upwardly, relative to a plane of said first guide surface, for deflecting the second leg of the pair of deflectable side by side legs upwardly into said second position within said second open space above said set plane.

4. The paper clip automatic attaching device of claim 1, wherein said holding means include a holding and travel channel for holding the stack of paper clips, and a spring loaded feeding mechanism located within said holding and travel channel for applying a force to move the lead paper clip of the stack into said paper clip travel path.

5. The paper clip automatic attaching device of claim 1, wherein said second support member comprises an upwardly and downwardly adjustable plate.

6. The paper clip automatic attaching device of claim 4, wherein said holding and travel channel is arranged at 90 degrees to, and connects into, said paper clip travel path.

7. The paper clip automatic attaching device of claim 4, wherein said spring loaded feeding mechanism includes a pair of guide rods for inserting through a slide hole in each leg of the pair of deflectable side by side legs of the paper clip in the stack to insure proper orientation of paper clips with said holding and feeding channel.

8. The paper clip automatic attaching device of claim 4, wherein said paper clip travel path has a top to bottom dimension slightly greater than a thickness of the crown portion of the paper clip where said holding and travel channel connects into said paper clip travel path.

9. An electrostatographic reproduction machine for producing toner images on copy sheets, the electrostatographic reproduction machine comprising:

(a) a moveable image bearing member having an image bearing surface;

(b) means for forming a toner image on said image bearing surface;

(c) a copy sheet supply and feeding assembly for feeding a copy sheet to a transfer station to receive said toner image from said image bearing surface;

(d) a fusing apparatus for fusing said toner image onto said copy sheet:

(e) a finishing unit for collecting said copy sheet and forming a set of said copy sheets;

(f) a paper clip automatic attaching device for automatically attaching, to a set of sheets, a paper clip having a crown portion and a pair of deflectable side by side legs, the automatic paper clip attaching device comprising;

(i) support assembly including a set compiler tray defining (x) a set plane for supporting a set of sheets, (y) an open space below said set plane, and (z) an open space above said set plane;

(ii) a paper clip travel path assembly defining a paper clip travel path adjoining said set plane for guiding a paper clip towards said set plane to be automatically attached to an edge of the set of sheets, said paper clip travel path assembly including (k) a first support member having a first guide surface for guiding a first leg of the pair of deflectable side by side legs into a first position within said space below said set plane, and (in) a second support member space from said first support member and having a second guide surface for deflecting a second leg of the pair of deflectable side by side legs into a second position within said open space above said set plane;

(iii) holding means for holding a stack of the paper clip in position for feeding a lead paper clip in the stack into said paper clip travel path; and (iv) powered means for contacting the common crown portions of the of the lead paper clip in the stack, and automatically pushing such lead paper clip, legs first, into an attached relationship with the set of sheets on said set plane;

(g) a set height sensor for sensing a height of the set of sheets on said set plane; and (h) a controller connected to said set height sensor for adjusting a height of said second guide surface relative to said first guide surface thereby deflecting the second leg of the pair of deflectable side by side legs responsively and proportionally to a sensed height of the set of sheets or said set plane.

10. The electrostatographic reproduction machine of claim 9, wherein said second guide surface of said second support member is spaced from said first guide surface of said first support member, a distance slightly greater than a length of the crown portion of the paper clip.

11. The electrostatographic reproduction machine of claim 9, wherein a plane of said second guide surface is inclined upwardly, relative to a plane of said first guide surface, for deflecting the second leg of the pair of deflectable side by side legs upwardly into said second position within said second open space above said set plane.

12. The electrostatographic reproduction machine of claim 9, wherein said holding means include a holding and travel channel for holding the stack of paper clips, and a spring loaded feeding mechanism located within said holding and travel channel for applying a force to move the lead paper clip of the stack into said paper clip travel path.

* * * * *